March 13, 1956 F. T. NIELSSON 2,738,265
PRODUCTION OF CARBONATED NITRIC PHOSPHATE FERTILIZER
Filed May 25, 1953
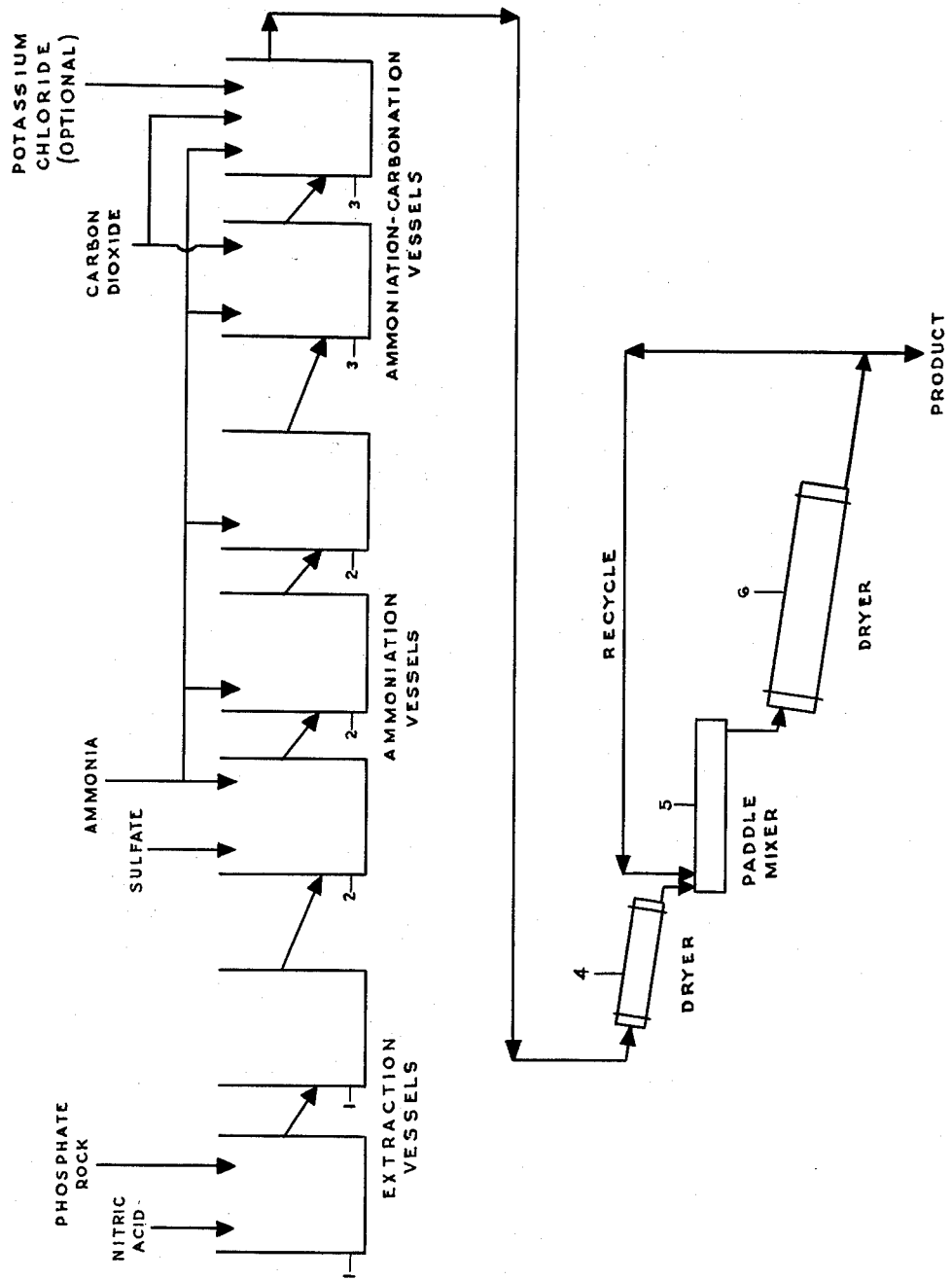
Francis T. Nielsson INVENTOR.
BY Bentley Q. Morrow
Attorney

United States Patent Office 2,738,265
Patented Mar. 13, 1956

2,738,265

PRODUCTION OF CARBONATED NITRIC PHOSPHATE FERTILIZER

Francis T. Nielsson, Muscle Shoals City, Ala., assignor to Tennessee Valley Authority, a corporation of the United States Application May 25, 1953, Serial No. 357,394

6 Claims. (Cl. 71—39)

(Granted under Title 35, U. S. Code (1952), sec. 266)

The invention herein described may be manufactured and used by or for the Government for governmental purposes without payment to me of any royalty thereon.

This invention relates to improvements in methods for the production of fertilizer wherein phosphate rock is reacted with nitric acid.

Processes are well known in which phosphate rock is extracted with nitric acid and the extract is treated with ammonia. The folowing simplified equations illustrate the reactions involved:

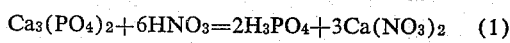

$$Ca_3(PO_4)_2 + 6HNO_3 = 2H_3PO_4 + 3Ca(NO_3)_2 \quad (1)$$

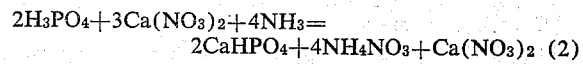

$$2H_3PO_4 + 3Ca(NO_3)_2 + 4NH_3 =$$
$$2CaHPO_4 + 4NH_4NO_3 + Ca(NO_3)_2 \quad (2)$$

Since calcium nitrate is very hygroscopic and, hence, is an undesirable constituent of fertilizer, various methods have been employed for eliminating calcium nitrate from the product of reaction (2). In one of these methods, potassium sulfate or ammonium sulfate is added:

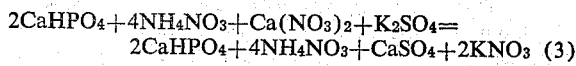

$$2CaHPO_4 + 4NH_4NO_3 + Ca(NO_3)_2 + K_2SO_4 =$$
$$2CaHPO_4 + 4NH_4NO_3 + CaSO_4 + 2KNO_3 \quad (3)$$

In another method, ammonia and carbon dioxide are added to eliminate the calcium nitrate:

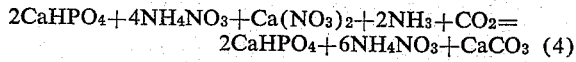

$$2CaHPO_4 + 4NH_4NO_3 + Ca(NO_3)_2 + 2NH_3 + CO_2 =$$
$$2CaHPO_4 + 6NH_4NO_3 + CaCO_3 \quad (4)$$

The latter method is potentially a very economical method of producing fertilizer. Studies, however, have shown that serious difficulties are encountered in carrying out the process.

One of these difficulties is that high availability of the $P_2O_5$ in the product can be attained only through extremely careful control of the distribution of ammonia in each of the ammoniation stages. Even slight localized over-ammoniation results in reversion of a considerable quantity of phosphate to citrate-insoluble state. A further difficulty is that, even with careful control, high $P_2O_5$ availability is attainable only at production rates that are low in comparison with rates that are practical for other nitric acid-phosphate rock processes in the same equipment, thus increasing the ratio of equipment expense to quantity of product formed. Still another disadvantage is that the amount of carbon dioxide that must be introduced for complete elimination of calcium nitrate is many times that theoretically required.

For convenience, the process typified by reactions (1), (2), and (4) will be referred to in this specification as the carbonated nitric phosphate process.

It is an object of this invention to provide a method for carrying out the carbonated nitric phosphate process so as to produce consistently a product of high $P_2O_5$ availability.

Another object is to provide such a process that does not require precise control of the distribution of ammonia.

Another object is to provide a process that can be carried out at high production rates.

Still another object is to provide a process in which only a slight excess of carbon dioxide is required.

Other objects and advantages of my invention will become apparent as this disclosure proceeds.

The process with which my invention is concerned involves the steps of extracting phosphate rock with nitric acid, treating the extract slurry with ammonia to precipitate substantially all the $P_2O_5$ as dicalcium phosphate, and thereafter treating the slurry by simultaneous addition of ammonia and carbon dioxide to convert the calcium nitrate remaining after treatment with ammonia alone to ammonium nitrate and calcium carbonate.

I have found that the foregoing objects can be attained and this basic process materially improved by adding to the slurry, before ammoniation has been carried to a mole ratio of $NH_3/NO_3$ of 0.5, a material which yields sulfate ions in the presence of a mixture of phosphoric acid and calcium nitrate. The amount of sulfate ion so added is such that the weight ratio of added $SO_4$ to total $CaO$ in the slurry is within the range 0.07 to 0.15.

The source of sulfate ion that is preferred for the process of my invention is a material selected from the group consisting of sulphuric acid, ammonium, potassium, magnesium, calcium, and sodium sulfates; and such naturally occurring sulfates as gypsum ($CaSO_4 \cdot 2H_2O$), glaserite ($Na_2SO_4 \cdot 3K_2SO_4$), langbeinite ($K_2SO_4 \cdot 2MgSO_4$), and kainite ($MgSO_4 \cdot KCl \cdot 3H_2O$) or mixtures thereof.

The attached drawing is a flow diagram illustrating one preferred method for carrying out the carbonated nitric phosphate process utilizing principles of my invention. As shown in this flow diagram, ground phosphate rock is extracted with nitric acid in extraction vessels 1. The slurry from the second extraction vessel is introduced into ammoniation vessels 2. In these vessels sufficient anhydrous ammonia is added to precipitate substantially all the $P_2O_5$ as dicalcium phosphate. At this point, most of the fluorine present has been precipitated as calcium fluoride. Before the slurry has been ammoniated to the point where it contains 0.5 mole of $NH_3$ per mole of $NO_3$, a sufficient amount of a material yielding sulfate ions is added to give a weight ratio of $SO_4/CaO$ of 0.07 to 0.15. The sulfate may be added in either of the extraction vessels 1, or, in a three-vessel ammoniation system, in the first ammoniation vessel.

I have found that addition of this small amount of sulfate eliminates the necessity of careful distribution of ammonia introduced into the slurry and permits rapid ammoniation, thus greatly increasing the quantity of product that can be produced from equipment of a certain size in a specified time. In addition to increasing the rate of production and eliminating difficulties due to localized over-ammoniation, I have found that introduction of this small amount of sulfate at a point where the slurry contains less than 0.5 mole of $NH_3$ per mole of $NO_3$ greatly increases the power of the slurry to absorb carbon dioxide so that complete carbonation can be attained in a later step with use of about one-seventh to one-fourth the quantity of carbon dioxide formerly necessary.

I do not know the reason for these observed facts, but it seems that some complex chemical reaction occurs by which either an increased proportion of available phosphate is formed or reversion of phosphate to unavailable form is inhibited, while absorption of carbon dioxide is promoted. Whatever this reaction may be, it is quite different from mere withdrawal of calcium by precipitation, as I have found that addition of calcium sulfate is substantially as effective as addition of more soluble sulfates.

The slurry from the ammoniation vessels 2 is introduced into ammoniation-carbonation vessels 3. Sufficient ammonia is added in these vessels to give a mole ratio of $NH_3/NO_3$ in the slurry of substantially 1.0. An excess of carbon dioxide over the theoretical amount required is still necessary; but only twice the amount of carbon dioxide theoretically required to convert to calcium carbonate the calcium nitrate in the slurry entering the first of the ammoniation-carbonation vessels 3 is sufficient, as compared to 8 to 13 times the theoretical quantity necessary without the addition of this small amount of sulfate ions. Optionally, potassium chloride may be added to the last ammoniation-carbonation vessel.

The slurry from ammoniation-carbonation vessels 3 is partially dried in dryer 4, is mixed with recycled dried fine material in paddle mixer 5, and the mixture is finally dried in dryer 6.

Studies of the carbonated nitric phosphate process, including the process of my invention, were carried out on a bench- and a pilot-plant scale. A pilot plant constructed according to the flow diagram of the attached drawing was used. Results of these studies are given in the following examples. Examples I and II illustrate results obtained by conventional type operation and are given for the purpose of contrast with the results in Examples III and IV, obtained by improving that process according to principles of my invention.

In all the tests described hereinafter, a Florida phosphate rock containing 34.4 per cent $P_2O_5$ and 49.4 per cent CaO was used. The phosphate was acidulated with nitric acid containing 42 per cent $HNO_3$. The proportions of acid and rock were such that the mole ratio of $HNO_3$ to CaO was 1.86, or approximately one part 100-per cent $HNO_3$ per part of rock.

In the following examples, data are presented contrasting results obtained by the methods of the prior art with results obtained by my improved process.

EXAMPLE I

In initial bench-scale tests of the conventional carbonated nitric phosphate process, 5000 grams of acidulate was ammoniated batchwise with anhydrous ammonia gas to an $NH_3/NO_3$ mole ratio of 0.63, which is the theoretical degree of ammoniation required to satisfy Equation 1, and then further ammonia was added together with carbon dioxide to an $NH_3/NO_3$ mole ratio of 1.0. The latter addition of ammonia was that required to satisfy Equation 4. It was found that at least 8 times the stoichiometric quantity of carbon dioxide indicated in Equation 4 was required if the ammoniated acidulate were to retain the stoichiometric amount of carbon dioxide.

The analyses given in the following table are typical of the results obtained in the bench-scale tests.

Table 1

|  | Ammoniated acidulate | Dried product |
|---|---|---|
| Total nitrogen, percent | 11.7 | 18.7 |
| $NH_3$ nitrogen, percent | 5.7 | 9.0 |
| Total $P_2O_5$, percent | 8.9 | 14.3 |
| Citrate-insoluble $P_2O_5$, percent | 0.1 | 0.8 |
| $P_2O_5$ availability, percent | 99.0 | 94.5 |
| $CO_2$, percent | 3.6 | 2.7 |
| $NH_3/NO_3$ mole ratio | 0.95 | 0.93 |

These results were regarded as reasonably good, although the $P_2O_5$ availability of the product was lower than desired.

EXAMPLE II

A series of runs, designed to test the conventional carbonated nitric phosphate process, was made in the pilot plant at phosphate rock feed rates of 50, 100, and 150 pounds per hour. Each run covered a 120-hour period. The original pilot plant had been satisfactory in producing other nitric phosphates at phosphate rock feed rates of 150 pounds per hour.

Results of these tests are given in the following tables.

Table 2

| Feed rate | Ammoniation stage | | | Ammoniation-carbonation stage | |
|---|---|---|---|---|---|
|  | 1 | 2 | 3 | 1 | 2 |
| 50 lb. rock/hr.: |  |  |  |  |  |
| $NH_3/NO_3$ mole ratio | 0.36 | 0.50 | 0.57 | 0.67 | 0.97 |
| $P_2O_5$ availability, percent | 98.0 | 97.3 | 95.4 | 88.6 | 95.6 |
| Water-soluble $P_2O_5$, percent |  |  | 9.0 | 3.0 | 0.0 |
| 100 lb. rock/hr.: |  |  |  |  |  |
| $NH_3/NO_3$ mole ratio | 0.37 | 0.55 | 0.59 | 0.70 | 0.98 |
| $P_2O_5$ availability, percent | 99.0 | 98.1 | 98.0 | 93.3 | 93.3 |
| Water-soluble $P_2O_5$, percent |  |  | 11.0 | 3.0 | 0.0 |
| 150 lb. rock/hr.: |  |  |  |  |  |
| $NH_3/NO_3$ mole ratio | 0.40 | 0.55 | 0.61 | 0.65 | 0.98 |
| $P_2O_5$ availability, percent | 99.0 | 98.0 | 96.1 | 84.6 | 83.8 |
| Water-soluble $P_2O_5$, percent |  |  | 13.0 | 5.0 | 0.0 |

Table 3

| Dried product | 50 lb. rock/hr. | 100 lb. rock/hr. | 150 lb. rock/hr. |
|---|---|---|---|
| Total nitrogen, percent | 17.9 | 18.9 | 18.0 |
| $NH_3$ nitrogen, percent | 8.5 | 9.3 | 8.7 |
| Total $P_2O_5$, percent | 15.1 | 14.6 | 14.8 |
| Citrate insoluble $P_2O_5$, percent | 0.7 | 1.0 | 2.2 |
| $P_2O_5$ availability, percent | 95.5 | 94.0 | 85.1 |
| $CO_2$, percent | 3.0 | 3.3 | 3.1 |
| $H_2O$, percent | 2.2 | 1.6 | 1.6 |

The results of the run in which the phosphate rock feed rate was 50 pounds per hour were reasonably satisfactory. At the 100-pound-per-hour rate, results were not so good as at the 50-pound-per-hour rate but were regarded as fairly satisfactory. The results obtained in the run in which the phosphate rock feed rate was 150 pounds per hour were unsatisfactory in that the $P_2O_5$ availability was too low to be acceptable commercially.

In all these runs it was necessary to use 13 times the stoichiometric amount of carbon dioxide in order to obtain satisfactory absorption of carbon dioxide. Constant attention to ammonia distribution was necessary to obtain maximum $P_2O_5$ availability.

EXAMPLE III

Following my discovery that sulfates tended to inhibit the formation of citrate-insoluble $P_2O_5$, a series of bench-scale tests was carried out on various potential inhibitors. In these tests the same phosphate rock and nitric acid mentioned previously were reacted batchwise. The inhibitor being tested was added to the acidulate and the resulting mixture was treated with gaseous ammonia. Nonsulfate salts as well as sulfates were tested to establish whether it was the sulfate ion or a metallic ion that possessed the property of inhibiting the formation of citrate-insoluble $P_2O_5$. The results of these tests are given below.

Table 4

| Additive material | $SO_4$/CaO weight ratio of acidulate after addition of inhibitor | $P_2O_5$ availability at 0.7 $NH_3/NO_3$ mole ratio, percent | Maximum $NH_2/NO_3$ mole ratio for 95% $P_2O_5$ availability |
|---|---|---|---|
| None |  | 76 | 0.63 |
| $Na_2SO_4$ | 0.04 | 76 | 0.64 |
| $Na_2SO_4$ | 0.08 | 89 | 0.65 |
| $Na_2SO_4$ | 0.19 | 96 | 0.71 |
| $(NH_4)_2SO_4$ | 0.03 | 66 | 0.64 |
| $(NH_4)_2SO_4$ | 0.08 | 92 | 0.68 |
| $(NH_4)_2SO_4$ | 0.11 | 92 | 0.68 |
| $K_2SO_4$ | 0.08 | 92 | 0.67 |
| $K_2SO_4$ | 0.22 | 95 | 0.70 |
| Langbeinite ($K_2SO_4 \cdot 1.8MgSO_4$) | 0.014 | 76 | 0.61 |
| Langbeinite ($K_2SO_4 \cdot 1.8MgSO_4$) | 0.08 | 98 | 0.75 |
| $MgSO_4$ | 0.08 | 94 | 0.69 |
| $H_2SO_4$ | 0.11 | 93 | 0.68 |
| $CaSO_4$ | 0.11 | 93 | 0.68 |
| $NaNO_3$ [a] | 0.07 | 76 | 0.62 |
| $MgCl_2$ [a] | 0.07 | 80 | 0.64 |
| KCl [a] | 0.07 | 79 | 0.62 |

[a] Equivalent on a mole basis to $SO_4$/CaO weight ratio indicated.

These tests showed the beneficial effects of the sulfate ion in inhibiting the formation of citrate-insoluble $P_2O_5$. They also showed that the metallic ions of the nonsulfate salts tested had little or no inhibiting effect. The effect of the sulfate addition was not as striking in these small-scale tests as it was in pilot-plant tests.

EXAMPLE IV

Additional pilot-plant runs were carried out under conditions identical to those of the test in Example II at a phosphate rock feed rate of 150 pounds per hour, except that in one of the runs described hereinafter langbeinite ($K_2SO_4 \cdot 1.8\ MgSO_4$) was added to give an $SO_4/CaO$ weight ratio of 0.08, and in the other run potassium sulfate was added to give the same $SO_4/CaO$ weight ratio. The results of these tests are given in the following tables. Each of the tests was of 120 hours' duration. The point of addition of sulfate was varied between the second extraction vessel and the first ammoniation vessel. The point of addition had no apparent effect on operation.

Table 5

|  | Ammoniation stage | | | Ammoniation-carbonation stage | |
|---|---|---|---|---|---|
|  | 1 | 2 | 3 | 1 | 2 |
| Langbeinite test: | | | | | |
| $NH_3/NO_3$ mole ratio | 0.42 | 0.57 | 0.62 | 0.69 | 0.98 |
| $P_2O_5$ availability, percent | 99.0 | 99.0 | 99.0 | 96.1 | 96.2 |
| Water-soluble $P_2O_5$, percent | | | 8.0 | 3.0 | 0.0 |
| pH | | 1.4 | 2.7 | 5.4 | 6.6 |
| Potassium sulfate test: | | | | | |
| $NH_3/NO_3$ mole ratio | 0.40 | 0.51 | 0.59 | 0.68 | 0.92 |
| $P_2O_5$ availability, percent | 99.4 | 99.3 | 98.9 | 98.9 | 96.9 |
| Water-soluble $P_2O_5$, percent | | | 12.4 | 2.7 | 0.0 |
| pH | | 1.4 | 2.7 | 5.4 | 6.6 |

Table 6

| Dried product | Langbeinite test | Potassium sulfate test |
|---|---|---|
| Total nitrogen, percent | 16.1 | 15.6 |
| $NH_3$ nitrogen, percent | 8.6 | 7.3 |
| Total $P_2O_5$, percent | 12.8 | 12.8 |
| Citrate-insoluble $P_2O_5$, percent | 0.3 | 0.2 |
| $P_2O_5$ availability, percent | 97.6 | 98.3 |
| $CO_2$ | 3.5 | 2.4 |
| $H_2O$ | 2.3 | |
| $K_2O$ | 0.5 | 1.5 |

The results of these tests were highly satisfactory. It was found that as little as 2 times the stoichiometric requirement of carbon dioxide could be employed without affecting the amount of carbon dioxide absorbed.

The improved results obtained in these runs are attributable only to the addition of sulfate. The apparent effect of the sulfate is to inhibit the formation of citrate-insoluble $P_2O_5$ or to inhibit the reversion of precipitated citrate-soluble $P_2O_5$ to citrate-insoluble form.

An additional benefit of the use of sulfate in the carbonated nitric phosphate process is its stabilizing effect on $P_2O_5$ availability during sudden interruptions of operation. When the flow of slurry to the ammoniation system ceases for some reason, overammoniation can occur readily before the flow of ammonia can be stopped. When this happened in the pilot-plant tests without sulfate addition, serious reversion of $P_2O_5$ occurred. In tests in which sulfate was added, however, no adverse effects on $P_2O_5$ availability were encountered when the slurry was accidentally overammoniated due to a stoppage of slurry.

It was found that in order to obtain the beneficial effects of soluble-sulfate addition, it was necessary to add the sulfate before the slurry had been ammoniated to an $NH_3/NO_3$ mole ratio of about 0.5.

I claim as my invention:

1. In a process for making fertilizer which comprises the steps of extracting phosphate rock with nitric acid, treating the exact slurry with sufficient ammonia to precipiate substantially all the $P_2O_5$ as dicalcium phosphate, and thereafter treating the slurry with simultaneous addition of ammonia and carbon dioxide to convert calcium nitrate to ammonium nitrate and calcium carbonate, the improvement that comprises adding to the slurry, before its $NH_3/NO_3$ mole ratio becomes 0.5, a material selected from the group consisting of sulfuric acid, ammonium sulfate, potassium sulfate, magnesium sulfate, calcium sulfate, and sodium sulfate, gypsum, glaserite, langbeinite, kainite, and mixtures thereof, the amount of said added material being such that the resulting ratio by weight of $SO_4$ to $CaO$ in the slurry is within the range of 0.07 to 0.15.

2. The process of claim 1 wherein the material added to the slurry is calcium sulfate.

3. The process of claim 1 wherein the material added to the slurry is sulfuric acid.

4. The process of claim 1 wherein the material added to the slurry is potassium sulfate.

5. The process of claim 1 wherein the material added to the slurry is ammonium sulfate.

6. The process of claim 1 wherein the material added to the slurry is langbeinite.

References Cited in the file of this patent

UNITED STATES PATENTS

| 1,517,687 | Voerkelius | Dec. 2, 1924 |
| 1,758,448 | Liljenroth | May 13, 1930 |
| 1,788,828 | Goldberg et al. | Jan. 13, 1931 |
| 1,806,029 | Thorssell | May 19, 1931 |
| 1,849,703 | Boller | Mar. 15, 1932 |
| 1,854,291 | Burdick | Apr. 19, 1932 |
| 1,948,520 | Harvey | Feb. 27, 1934 |
| 2,555,656 | Plusje | June 5, 1951 |

FOREIGN PATENTS

| 1,644 | Great Britain | May 9, 1874 |